Nov. 11, 1958  G. A. HALL  2,859,578
POWER MOWER ATTACHMENT
Filed March 26, 1956  2 Sheets-Sheet 1

Inventor
Gilbert A. Hall
by Parker & Carter
Attorneys

Nov. 11, 1958 G. A. HALL 2,859,578
POWER MOWER ATTACHMENT
Filed March 26, 1956 2 Sheets-Sheet 2

Inventor
Gilbert A. Hall
by Parker & Carter
Attorneys

United States Patent Office 2,859,578
Patented Nov. 11, 1958

2,859,578

POWER MOWER ATTACHMENT

Gilbert A. Hall, Alma, Ga.

Application March 26, 1956, Serial No. 573,728

3 Claims. (Cl. 56—25.4)

This invention relates to mowers and particularly to mower attachments to vehicles, such as tractors and the like.

One purpose of the invention is to provide a mower suitable for association with a vehicle, such as a tractor and for operation in a position forward of the vehicle.

Another purpose of the invention is to provide a forward mower for vehicles wherein the mower and vehicle are operable from the same source of power.

Another purpose is to provide a forward mower for vehicles wherein a source of power on the vehicle may be employed to raise the mower out of operating position and to lower the mower into operating position.

Another purpose is to provide a mower positionable forward of a vehicle and adjustable in height.

Another purpose is to provide a vehicle mower accessory having means for adjusting the height of the cut produced by the mower.

Another purpose is to provide a vehicle mower attachment having ground supporting wheels and means for adjusting the height thereof.

Another purpose is to provide a vehicle mower attachment wherein the mower means is flexibly retained against lateral and vertical movement.

Other purposes will appear from time to time in the course of the specification and claims.

I illustrate my invention more or less diagrammatically wherein.

Like parts are indicated by like numerals throughout the specification and claims.

Figure 1:
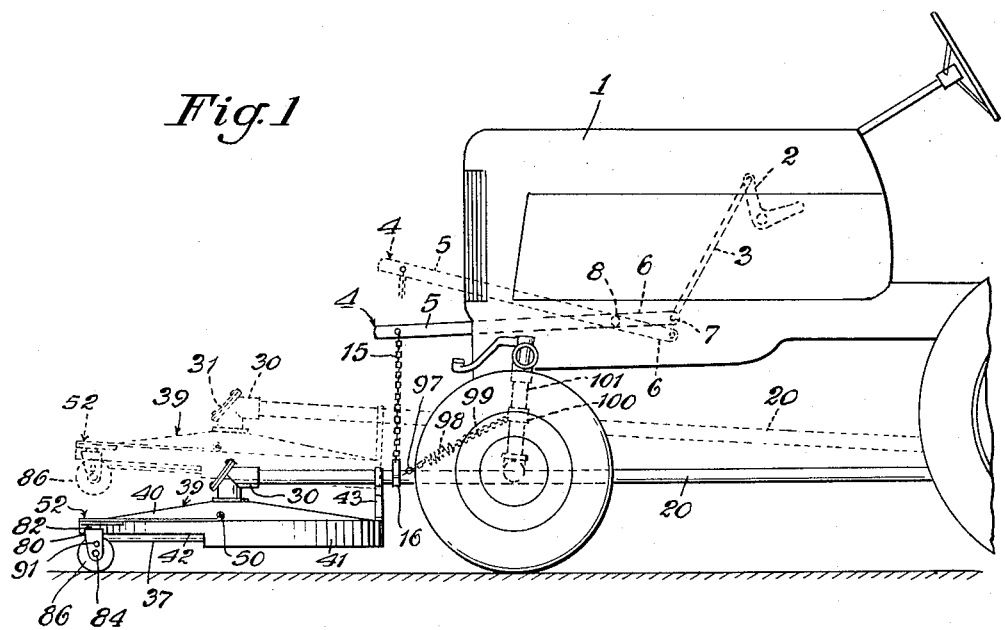
Figure 1 is a fragmentary side elevation.

Referring now to the drawings and particularly to Figure 1 thereof, the numeral 1 generally indicates a vehicle and for convenience I illustrate a tractor. The tractor 1 may be of standard construction and may have thereon a bell crank shown in dotted lines at 2 in Figure 1. It will be understood that the bell crank 2 may be operated by an accessory source of power normally carried on tractors and the like, such as a hydraulic motor. The bell crank 2 may be moved, however, by other power sources and may even be manually controlled without departing from the nature and scope of my invention.

Figure 2:
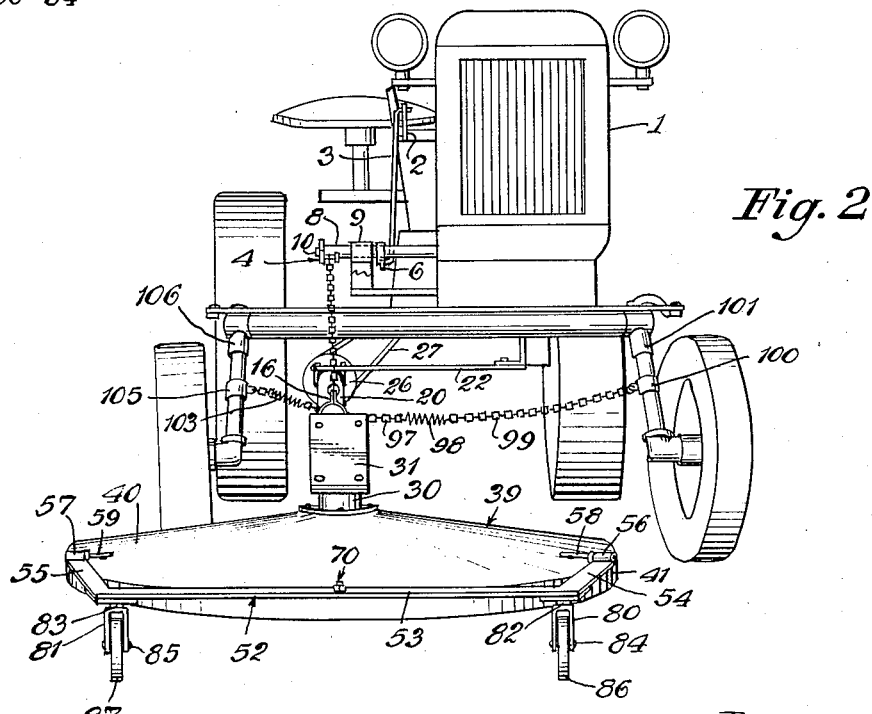
Figure 2 is a front elevation.

A link rod 3 joins one arm of the member 2 to one end of a rocker or lift arm generally indicated at 4. The member 4 comprises a major lifting arm 5 and a shorter arm portion 6. The link rod 3 is pivotally joined to the outer end of the arm 6 as at 7. As best seen in Figure 2, the opposite end of the arm 6 is secured to a shaft 8 which is rotatably journaled in a boss 9. Similarly, the arm portion 5 has its inner end secured to the shaft 8 as at 10. As best seen in Figure 1, the arms 5, 6 lie in the same plane and are merely off-set from each other on opposite sides of the boss 9. The outer end of the arm 5 carries a flexible member 15 which is a link chain having at its outer end a loop or bracket 16.

Figure 3:
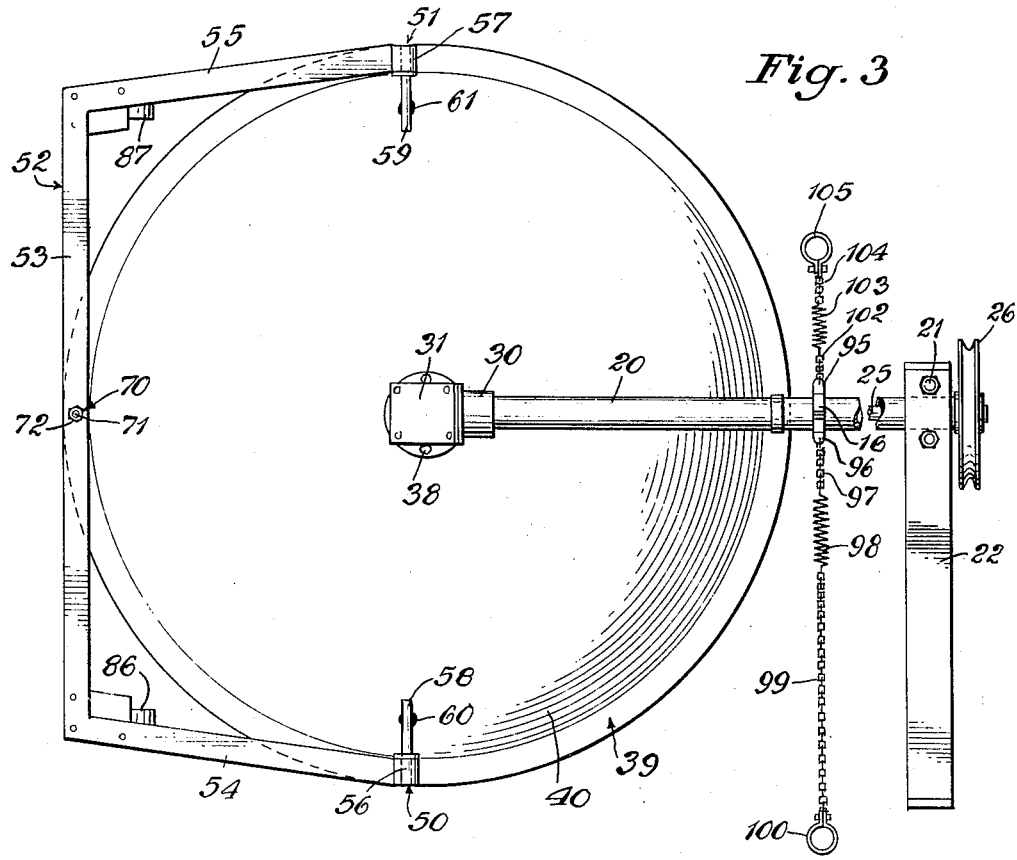
Figure 3 is a top plan view, on an enlarged scale and with parts broken away.

Extending through the bracket 16 is an elongated drive shaft housing 20. As best seen in Figure 3, the rear end of the shaft housing 20 is supported on the vehicle 1 by a U-bolt partially shown at 21 in Figure 3, or other suitable means. The U-bolt 21 has its spaced threaded ends connected to a lateral cross-bar 22. Rotatably mounted within and extending longitudinally through the shaft housing 20 is a shaft 25. The rear end of the shaft 25 beyond the housing 20 carries the pulley 26. As best seen in Figure 2, the pulley 26 is driven by a belt 27 which is in turn driven by the power source of the vehicle 1.

The shaft housing 20 carries at its outer or forward end a gear housing generally indicated at 30. The gear housing 30 is generally L-shaped and has a diagonally disposed cover plate 31. The shaft 25 has its forward end extending into the housing 30 and carries an angle gear 32. The gear 32 is enmeshed with a second angle gear 33 which is in turn fixed on a shaft 34 rotatable in a vertically disposed shaft housing 35 which is secured as at 36 to the housing 30. The shaft 34 supports adjacent its lower or outer end a mower means such as the rotatable blade member 37.

Figure 4:
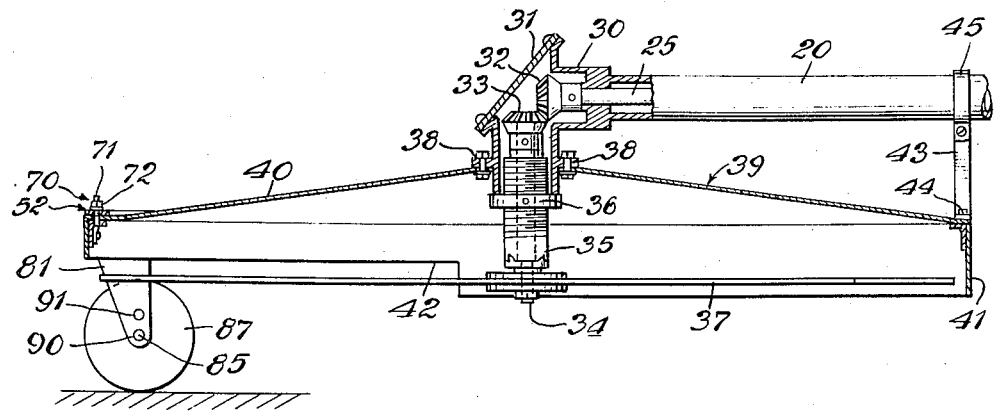
Figure 4 is an elevational view, on an enlarged scale, of the cutting assembly shown in Figure 3, with parts broken away and shown in section.

Secured as at 38 to the housing 30 is a mower blade housing shown generally at 39. The housing 39 has a generally conical, circular upper wall 40 and a generally cylindrical side wall 41. A forward substantially semi-circular portion of the wall 41 is upwardly off-set or recessed as indicated at 42 to permit ready access of the blade 37 to the growth to be cut. A strap 43 is connected at its opposite ends to the housing 39 as at 44 and to the shaft housing 20 as at 45. Hingedly mounted on the housing 39 as indicated generally at 50, 51 is a supporting frame 52. The frame 52 has a laterally extending forward strip 53 having rearwardly disposed strip elements 54, 55, at its opposite end. To form the hinges or pivots 50, 51, the strips 54, 55 are reawardly bent upon themselves to form loops 56, 57 through which the pins 58, 59 extend. The pins 58, 59 are welded or otherwise secured to the upper wall 40 as at 60, 61. The frame 52 is adjustably positioned with relation to the housing 39 and consequently to the mower cutting means 37 as indicated generally at 70. The frame strip 53 overlies, at its central portion, a forward portion of the housing 39 and housing wall 40. A thread means 71 extends from beneath the cover wall 40 upwardly therethrough and through an opening or aperture generally centrally positioned in the strip 53. A securing means such as the nut 72 is turned on the threads of the member 71 to adjust the relationship of the frame 52 and the housing 39 and cutter 37. Secured to the undersurface of the frame 52, at the junctures of the strips 54, 53 and 55, 53 are the downwardly disposed spaced wheel supporting brackets 80, 81. The brackets 80, 81 are rotatably supported by and beneath the frame 52 as indicated generally at 82, 83. Axles 84, 85 extend through the brackets 80, 81 and wheels 86, 87, respectively. Each of the spaced arms of the brackets 80, 81 carries a pair of vertically spaced aligned apertures shown best in Figure 4 and, for convenience, given the numerals 90, 91. While only one arm of the bracket 81 is shown in Figure 4, it will be realized that the apertures 90, 91 are horizontally aligned with a similar pair of apertures in the opposite arm of the bracket 81 and that the brackets 80, 81 are identical. The axles 84, 85 are shown in the drawings as extending through the lowermost set of apertures 90 in each of the brackets 90, 91.

The supporting clamp or bracket 16 has opposite extending ears 95, 96 thereon. A flexible member comprising a link chain 97 is connected at one end to the ear 96 and at the opposite end to a spring 98. The opposite end of the spring 98 is connected, by means of a flexible chain 99, to a clamp or bracket 100 which surrounds a portion 101 of the vehicle 1. The opposite disposed ear 95 is similarly connected by means of a chain 102, spring 103, chain 104 and bracket 105 to a vehicle portion 106, the vehicle portions 101, 106 being disposed on opposite sides of the mower shaft housing 20.

It will be realized that, whereas I have described and illustrated a practical and operative device, nevertheless, many changes may be made in the size, shape, number and disposition of parts without departing from the spirit of my invention. I therefore wish my description and drawings to be taken as in a broad sense illustrative or diagrammatic rather than as limiting me to my precise showing.

The use and operation of my invention is as follows:

When the operator wishes to lower the mower into operating position he merely actuates the bell crank 2, rotating it in clockwise direction to lower the arm 5 and thus to allow the ground contacting wheel members 86, 87 to ride along the ground in front of the tractor 1. The chain 15 loosely or flexibly retains connnection between the arm 5 and the mower while allowing the mower to rise as the wheels follow the contour of the earth. Similarly, the flexible members 97—99 and 102—104 permit lateral movement of the mower while retaining the generalized location of the mower in relation to the vehicle. The springs 98, 103 in association with the link chains connected therethrough, permit lateral movement of the mower, for example, in response to the contact of the mower with rocks, tree-stumps, etc., while at the same time being effective to hold the mower generally captive in the desired location.

Adjusting means for adjusting the height of the cut to be made by the blade 37 are provided in the dual-axle-position caster brackets 80, 81 and in the adjustable connection between the wheel frame 52 and the mower housing 40.

I claim:

1. In a forward mower attachment for vehicles and the like, a shaft housing and means for flexibly supporting it on a vehicle, said means including an elongated flexible member attached to said shaft housing and to the vehicle at a point above said shaft housing, a mower housing secured to said shaft housing, a mower drive shaft rotatably supported in said shaft housing, cutter means rotatably supported in said mower housing, a drive connection between said shaft and said cutter means and means for adjusting the cutting height of said cutter means above the ground, said last named means including a frame hingedly mounted on said mower housing, ground contacting members rotatably mounted on said frame and an adjustable connection between said frame and said mower housing.

2. In combination a vehicle and front mower attachment therefor, said attachment comprising a hollow tubular shaft housing extending beneath and forwardly of the tractor, a mower housing secured to the forward end of the shaft housing, a mower drive shaft rotatably mounted in said shaft housing, means carried by said vehicle and operatively connected to one end of said shaft to rotate the same, cutter means in said mower housing and a drive connection between said cutter means and the opposite end of said shaft, means for flexibly positioning said shaft housing and mower housing in relation to the longitudinal central line of said vehicle and means for adjustably positioning said mower housing above the ground including a frame hingedly mounted on said mower housing and extending forwardly of said frame, ground contacting wheels rotatably supported on said frame forwardly of said mower housing and means operatively connected with said frame and a forward portion of said mower housing to adjustably provide an angular relationship between said frame and said mower housing.

3. In combination, a vehicle and front mower attachment therefor, said attachment comprising a hollow elongated tubular shaft housing, a mower housing supported on the forward end of said shaft housing, cutter means rotatably mounted in said mower housing, a drive shaft rotatably mounted in said shaft housing and having a driving connection with said cutter means and means for flexibly positioning said mower housing in relation to the longitudinal center line of said vehicle said last named means including a first yielding member flexibly connected to said shaft housing and said vehicle on one side of said shaft housing and a second yielding member flexibly connected to said shaft housing and said vehicle on the opposite side of said shaft housing.

References Cited in the file of this patent

UNITED STATES PATENTS

| | | |
|---|---|---|
| 73,314 | Fisher | Jan. 14, 1868 |
| 137,614 | McCandlish et al. | Apr. 8, 1873 |
| 269,232 | Pridmore | Dec. 19, 1882 |
| 297,368 | Fisher | Apr. 22, 1884 |
| 365,558 | White | June 28, 1887 |
| 2,143,473 | Brown | Jan. 10, 1939 |
| 2,251,378 | Simpson | Aug. 5, 1941 |
| 2,477,442 | Cramer et al. | July 26, 1949 |
| 2,601,366 | Chapman | June 24, 1952 |
| 2,680,946 | Rousey | June 15, 1954 |
| 2,688,833 | Weiss et al. | Sept. 14, 1954 |
| 2,723,518 | Carlson | Nov. 15, 1955 |
| 2,734,326 | Gebhart | Feb. 14, 1956 |
| 2,743,565 | Dow | May 1, 1956 |
| 2,763,977 | Spencer et al. | Sept. 25, 1956 |